June 20, 1950 H. B. MOORE 2,512,363
CHECK FORMING IMPLEMENT
Filed Nov. 26, 1948 4 Sheets-Sheet 2

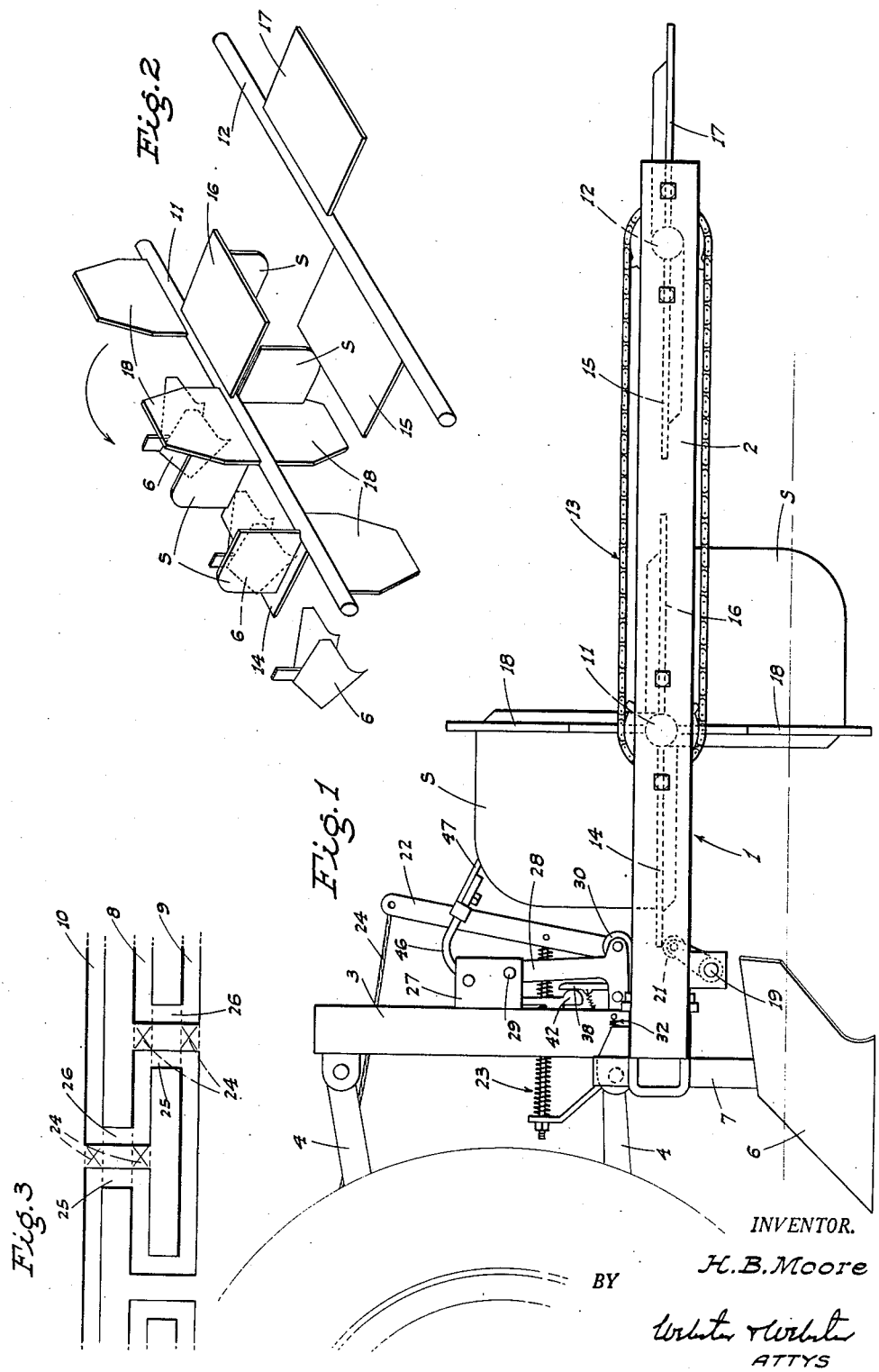

INVENTOR.
H. B. Moore
BY
ATTYS

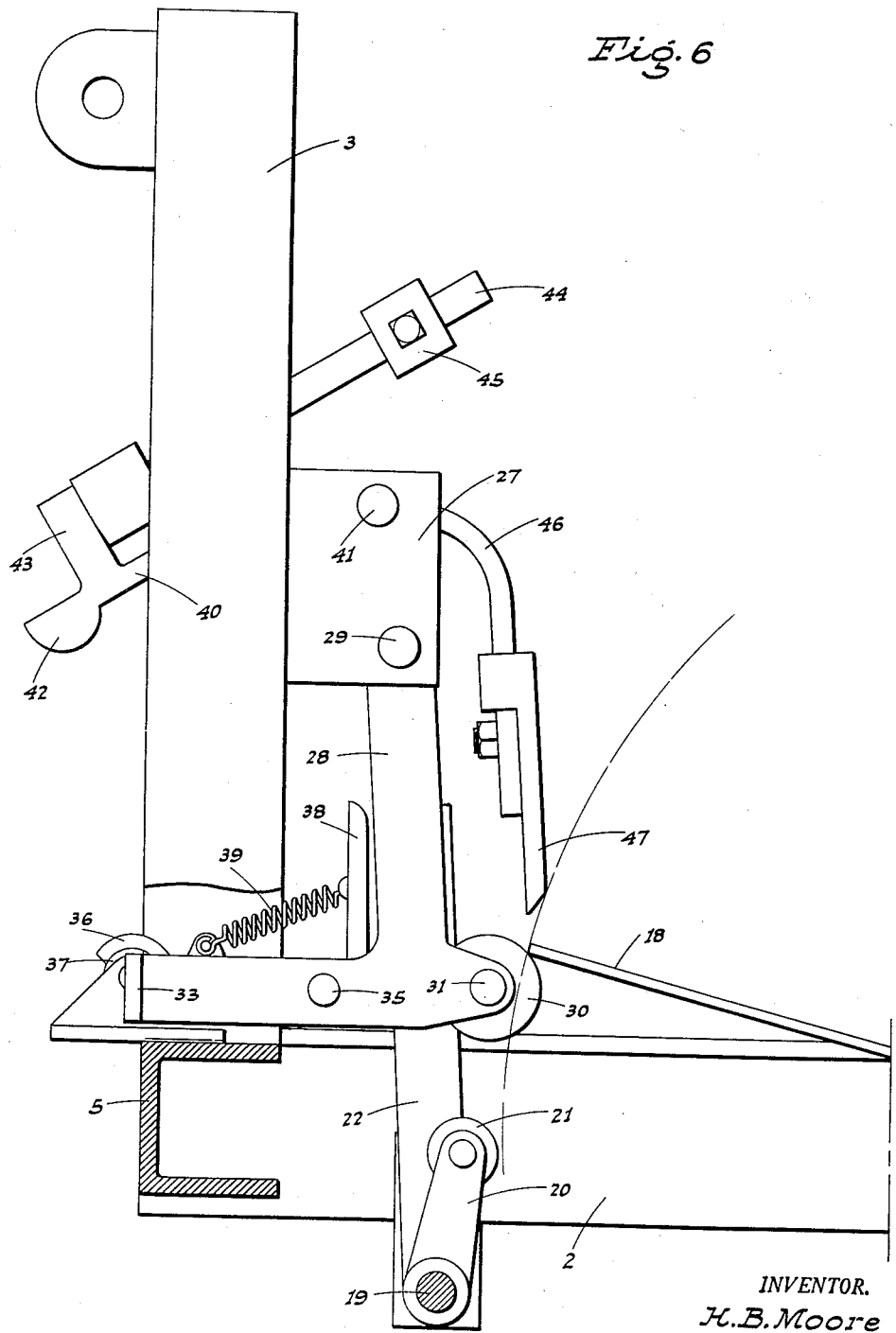

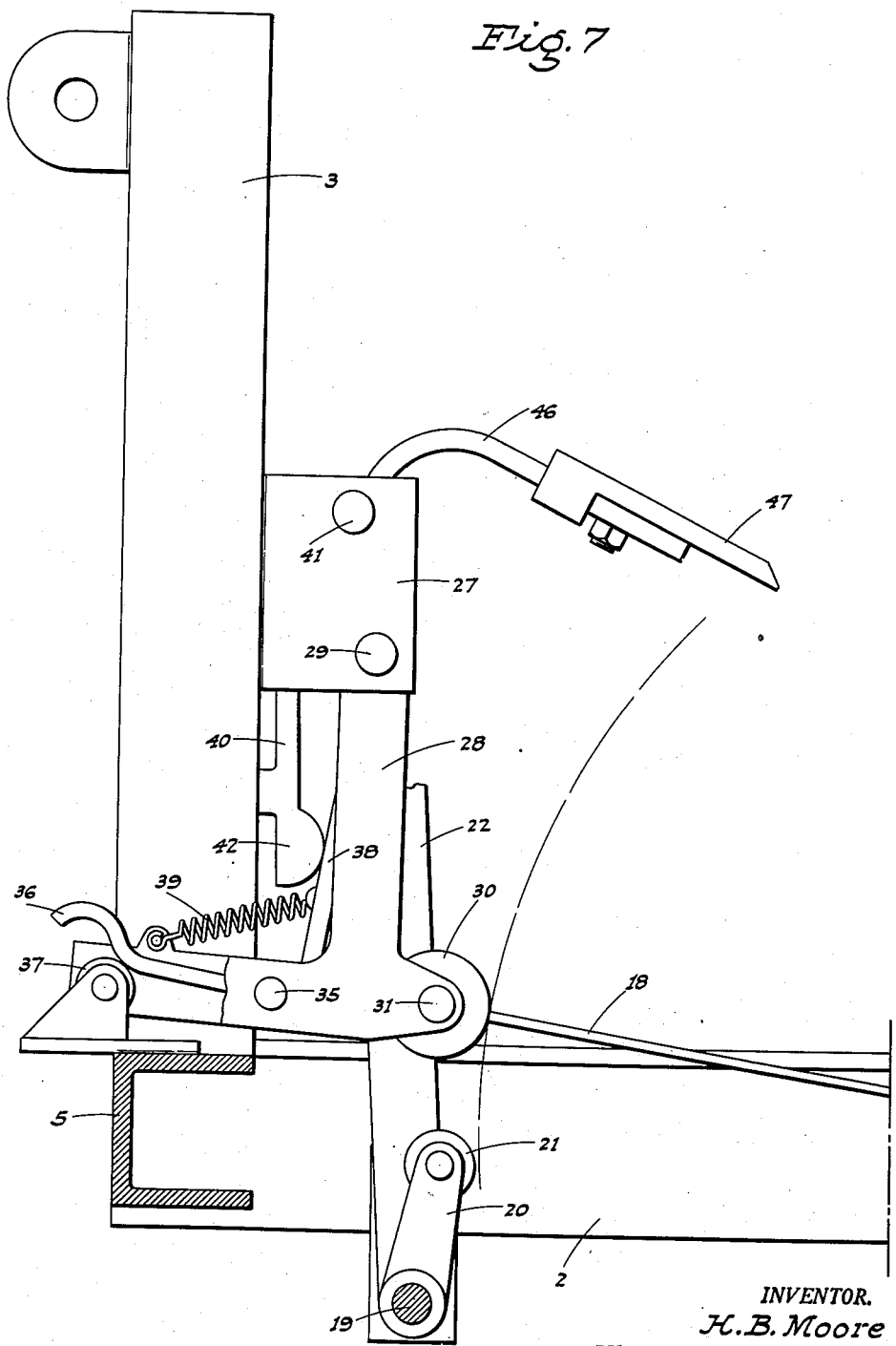

Patented June 20, 1950

2,512,363

UNITED STATES PATENT OFFICE 2,512,363

CHECK FORMING IMPLEMENT

Herbert B. Moore, Winton, Calif., assignor to G. and M. Equipment Company, Winton, Calif., a partnership Application November 26, 1948, Serial No. 62,055

10 Claims. (Cl. 97—55)

This invention is directed to, and it is an object to provide, a novel agricultural implement for forming, blocking, and interconnecting adjacent irrigation furrows in a pattern wherein the water travels a circuitous path for reducing the rate of flow and accomplishing maximum earth penetration of the irrigation water.

Another object of the invention is to provide an implement, as above, which is operative upon advance of said implement to dig three side by side furrows, and to cut adjacent but spaced transverse channels between the central furrow and alternate side furrows at longitudinally spaced or staggered points, with such transverse channels on opposite sides of checks formed in each pair of furrows so interconnected.

This provides an irrigation flow course or pattern which comprises a plurality of side by side, elongated, substantially half-lapping, and interconnected box channels as herein illustrated.

A further object of the invention is to provide an implement, of novel construction and for the above purpose, which includes a rotary earth working assembly adapted to form said checks, and to cut the transverse channels at correct points.

An additional object of the invention is to provide an implement, as in the preceding paragraph, which includes cross shafts from which ground drag actuated, check forming and transverse channel digging blades project in predetermined relation; there being novel time-delay means arranged to hold the transverse channel digging blades in operative or digging position slightly longer than would occur upon unrestricted rotation thereof with the shafts; such time-delay being to assure of the digging of transverse channels having adequate width.

It is also an object of the invention to provide an implement, for forming an irrigation flow course of circuitous pattern, which is relatively simple and rugged in structure, and designed for ease and economy of manufacture.

A further object of the invention is to provide a practical and reliable implement for the purpose described, and one which will be exceedingly effective.

These objects are accomplished by means of such structure and relative arrangement of parts as will fully appear by a perusal of the following specification and claims.

In the drawings:

Fig. 1 is a side elevation of the implement as in use.

Fig. 2 is a perspective view showing the shaft-mounted assembly of check forming plates and transverse channel digging plates; such assembly being illustrated detached from the remainder of the implement.

Fig. 3 is a diagrammatic plan view of the circuitous irrigation flow course or pattern formed by the implement.

Fig. 6 is an enlarged fragmentary side elevation of the time-delay mechanism in holding position.

Fig. 7 is a similar view, but shows said time-delay mechanism released.

Figure 5:
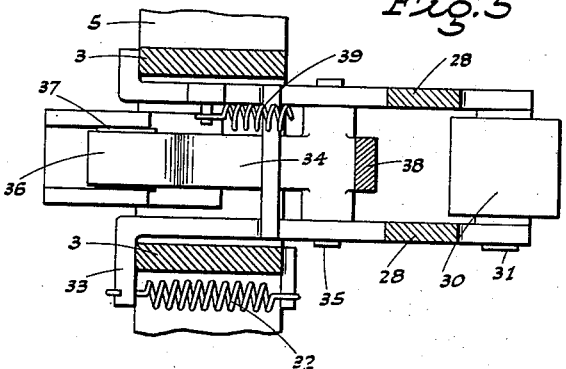
Fig. 5 is a cross section on line 5—5 of Fig. 4.

Referring now more particularly to the characters of reference on the drawings, and mainly at present to Figs. 1-3 inclusive, the implement comprises a horizontal, elongated main frame, indicated generally at 1, which main frame includes side beams 2. At the front the main frame 1 is fitted with an upstanding lift frame 3 adapted for connection to the power lift mechanism 4 of a tractor, whereby the main frame 1 may be selectively vertically adjusted.

At the front thereof the main frame 1 includes a front cross beam 5, and three transversely and evenly spaced plows 6 are suspended from said front cross beam 5 by means including standards 7; such plows digging, with advance of the implement, a control furrow 8 and side furrows 9 and 10.

Some distance rearwardly of the upstanding lift frame 3, the main frame 1 is fitted with a front cross shaft 11 journaled between the side beams 2, and rearwardly of such cross shaft there is a rear cross shaft 12 likewise journaled between said side beams 2. The shaft 12 is connected in driven relation with the shaft 11 by a conventional sprocket and chain unit 13.

A pair of channel digging plates 14 and 15 are affixed on and radiate from the cross shafts 11 and 12 in the same direction; such channel digging plates 14 being of a width, and so positioned, that they span between the central furrow 8 and the side furrow 9 formed by the plows 6. Similarly, another pair of channel digging plates 16 and 17 are fixed on and radiate from the shafts 11 and 12 in the same direction with respect to each other, but which are angularly displaced about the shafts 180 degrees relative to the plates 14 and 15, respectively; such plates 16 and 17 being of a width, and so positioned, that they span between the central furrow 8 and the side furrow 10.

With the above arrangement it will be seen that when the channel plates 14 and 15 project rearwardly in a horizontal position, the channel digging plates 16 and 17 are horizontal in forwardly projecting relation; i. e. disposed 180° apart from said plates 14 and 15.

Transversely spaced side skirts S on the channel digging plates 14 and 16, which skirts project in trailing relation from said plates, act as drag elements which assure of positive rotation of the shaft-supported plate assembly.

Additionally, the front shaft 11 carries two pairs of transversely spaced check forming plates 18 radiating therefrom, with the pairs 180° apart and 90° from the adjacent channel digging plates 14 or 16. The check forming plates 18 are set on the front cross shaft 11 so that the plates of one pair are alined with the central furrow 8 and side furrow 9, whereas the plates of the other pair are alined with the central furrow 8 and said furrow 10.

The initial or normal position of the above described shaft-supported, channel digging and check forming plate assembly is as shown in Fig. 2; such assembly being releasably maintained in such position by a stop unit constructed as follows:

A cross shaft 19 is journaled in connection with the main frame 1 adjacent but to the rear of the lift frame 3, and a short radial arm 20 extends from shaft 19 at an upward and rearward incline, carrying a stop roller 21 on its upper end which normally abuts against the under side of the forwardly projecting channel digging plate; said stop roller 21 being of sufficient axial extent so that it will engage beneath either the channel digging plate 16 or 14, whichever is projecting foremost.

An upstanding lever 22 is fixed on the cross shaft 19 and is normally urged rearwardly by a compression spring unit 23. A pull rope 24 leads from the upper end of the lever 22 to adjacent the tractor seat.

On advance of the implement the three transversely spaced plows 6 first form the furrows 8, 9, and 10; the then downwardly projecting pair of check forming plates 18 running in the corresponding furrows, which by reference to Figs. 2 and 3 would be in the central furrow 8 and side furrow 9. These working check forming plates constantly push a quantity of dirt thereahead, forming checks 24 in the corresponding furrows.

At a selected point the operator pulls on the rope 24, releasing the stop roller 21, whereupon—under the influence of ground drag on the working check forming plates 18, the plate assembly begins to revolve in the direction indicated by the arrow in Fig. 2. This rotation is continued by the forwardly projecting pair of channel digging plates, as for example 14 and 15, biting into the earth between the furrows 8 and 9. With the exception of the time-delay as hereinafter explained, such channel digging plates continue to rotate rearwardly under the influence of the ground drag, cutting a pair of transverse channels 25 and 26 between the central furrow 8 and side furrow 9 ahead, and to the rear, respectively, of the checks 24 left by the checking forming plates 18 prior to the beginning of their upward and rearward swinging motion.

After the shaft-supported plate assembly has turned through 180° the stop roller 21 then receives the forwardly projecting channel digging plate to stop the motion.

In the illustration of Figs. 2 and 3 the channel digging plates 16 and 17 would then be projecting forward and the corresponding pair of check forming plates 18 would then be dependent in working position. It will thus be evident that when the parts have moved to this position, and after the implement has moved forward a certain distance, the operator, by merely pulling on the rope 24 and releasing the stop roller 21, permits the shaft-supported plate assembly to form checks in, and interconnecting transverse channels between, the central furrow 8 and side furrow 10 in exactly the same manner as described above with respect to the central furrow 8 and side furrow 9. This results in the formation of an irrigation flow course or pattern which is circuitous, in the manner illustrated in Fig. 3, which flow course includes a plurality of side by side, elongated, substantially half-lapping and interconnected box channels. By such circuitous flow course the flow rate can be effectively controlled, and maximum water penetration into the earth is assured.

It is desirable, with each operation of the shaft-supported plate assembly—either the right hand or the left hand operation—that the pair of channel digging plates which sweep downwardly to dig corresponding channels have a slight delay imparted thereto as they work in the earth; this for the purpose of assuring that the channels are of sufficient width for effective water transfer between the furrows.

The time-delay mechanism which is employed to accomplish the above function is automatic in its operation; and said mechanism is shown in detail primarily in Figs. 4–7 inclusive.

This time-delay mechanism comprises:

A bracket 27 is fixed in connection with the upstanding lift frame 3 intermediate its ends and projects rearwardly. An L-shaped holding arm 28, with the lower leg projecting forwardly, is pivoted at the upper end, as at 29, to the bracket 27 for swinging in a longitudinal vertical plane; there being a rearwardly exposed stop roller 30 pivoted, as at 31, to the holding arm 28 at its elbow. The holding arm 28 is of two-part type; i. e. comprises two transversely spaced members between which certain working parts, such as the stop roller 30, are mounted.

Figure 4:
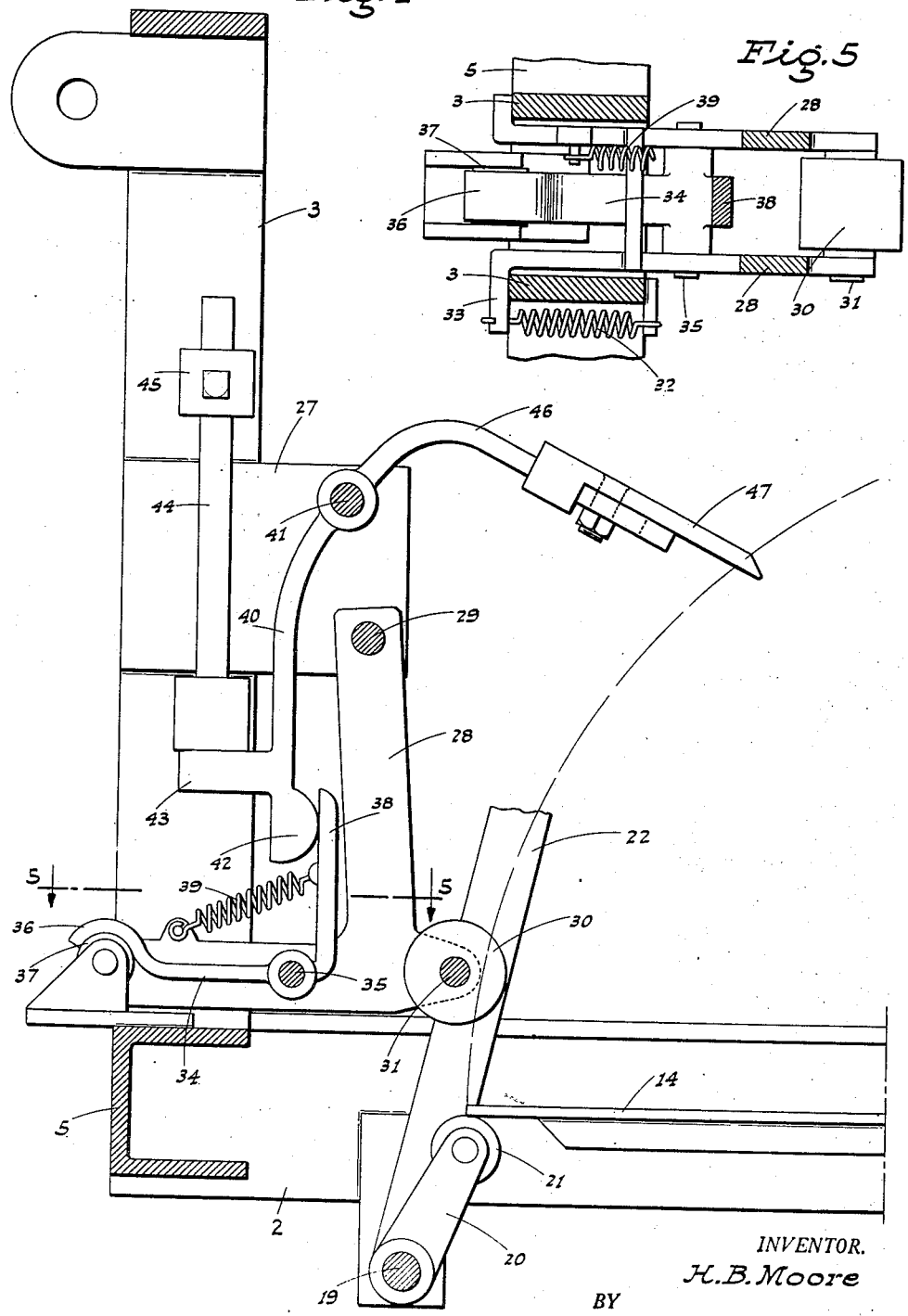
Fig. 4 is an enlarged fragmentary sectional elevation showing the releasable stop unit and the time-delay mechanism; the stop unit being shown in holding position.

The holding arm 28 is normally maintained in a retracted position, as for example in Fig. 4, by means of a tension spring 32 (see particularly Fig. 5) connected between a lateral finger 33 on said arm and an anchor point on the frame; such finger 33 normally abutting a portion of the frame in stop relation.

Forward swinging movement of the holding arm 28 against the tension of spring 32 is normally prevented by a catch arm 34 pivoted, as at 35, in the lower leg of said arm 28; such catch arm 34 extending forwardly and having a downwardly opening hook 36 on its forward end which engages in holding relation over a roller 37 fixed in connection with the front cross beam 5.

With this arrangement of the catch arm 34 the holding arm 28 cannot normally swing forwardly, and such catch arm includes an upstanding finger 38 for the main purpose hereinafter described, but which finger also serves for connection of a tension spring 39 which urges the catch arm 34 in a direction to hold hook 36 on roller 37.

A pendulum 40 is pivoted, as at 41, to the bracket 27 and depends ahead of the holding arm 28 and upstanding finger 38; such pendulum having a striker head 42 on its lower end. A boss 43 projects forwardly from the pendulum adjacent its lower end, and a post 44 upstands from said boss; there being an adjustable weight 45 on the post 44 to control the rate of said pendulum.

Rearwardly of the shaft 41 the pendulum includes a rearwardly projecting arm 46 having a trigger plate 47 on its free end, which trigger plate is disposed in the path of forward motion of each upstanding, central check forming plate 18.

The operation of the above described time-delay mechanism is as follows:

Upon release of the stop roller 21 to cause a check forming and transverse channel digging operation, either right or left, the forwardly projecting channel digging plates 14 and 15 or 16 and 17, as the case may be, immediately swing downward and enter the ground, and at the same time the upstanding, central, check forming plate 18 begins a forward and downward motion. With such forward and downward motion, said central check forming plate first strikes the trigger plate 47 in its position as shown in Fig. 4, swinging it downwardly to the position shown in Fig. 6, which causes the pendulum 40 and its striker head 42 to swing forwardly and upwardly.

Said central check forming plate then comes to rest on the stop roller 30, causing a delay of the channel digging plates which have entered the ground and are then in a channel digging position. For the few moments that the central check forming plate 18 rests on the stop roller 30, the implement is of course advancing, causing the operative channel digging plates to cut wider channels than otherwise.

This few moments is what may be termed the time-delay, which is controlled by the rate of swinging of the pendulum 40 from its raised position, as in Fig. 6, to a "down" or striking position, as in Fig. 7.

When the forwardly swinging, central check forming plate 18 escapes the trigger plate 47 immediately above the stop roller 30, the pendulum 40 starts its downward swinging motion, which motion continues until the striker head 42 strikes the upstanding finger 38, throwing the catch arm 34 and hook 36 upwardly, freeing the same from the roller 37. Upon this occurring the pressure of the check forming plate 18 bearing on the roller 30, as in Fig. 6, causes the holding arm 28 to swing forwardly, whereupon said plate escapes such roller and continues its downward motion. Thereafter, the shaft-supported plate assembly completes its 180° operation, which operation is brought to a stop by the then projecting channel digging plate 14 or 16 striking and coming to rest on the stop roller 21, preparatory to the next operation.

The tension spring 32 acts of course to reset the holding arm 28 to its normal or starting position, with the catch arm 34 and hook 36 in holding relation to said arm; the pendulum 40 assuming its starting position by gravity.

The invention as above described provides a very practical and reliable implement for forming, in the earth, an irregular flow course or pattern for the purpose of more effective irrigation than is accomplished in straight furrows or channels. With the irrigation flow in a circuitous pattern, maximum water penetration is accomplished.

Additionally, in the time-delay mechanism the invention provides for the most effective action of the channel digging plates whereby the same cut transverse channels, between the central and outer furrows, which are of sufficient width lengthwise of the direction of travel for free water interchange between the furrows in the pattern.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, and time-delay mechanism cooperating with said plate assembly arranged to momentarily interrupt such rotary motion of said channel digging plate after its release by the stop unit and during engagement of the plate in the earth in channel digging relation.

2. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, and time-delay mechanism cooperating with said plate assembly arranged to momentarily interrupt such rotary motion of said channel digging plate after its release by the stop unit and during engagement of the plate in the earth in channel digging relation; said time-delay mechanism including a normally latched but retractible stop, a member on the rotary plate assembly adapted to engage said retractible stop, and means to release and retract the latter a delayed time after engagement of the member therewith.

3. An implement, as in claim 2, in which said plate assembly includes a cross shaft, said member radiating from the cross shaft in trailing relation to the channel digging plate.

4. An implement, as in claim 3, in which said member is a check forming plate; there being a pair of said check forming plates on the shaft, and one such check forming plate normally upstanding to the rear of said normally, forwardly projecting channel digging plate.

5. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, and time-delay mechanism cooperating with said plate assembly arranged to momentarily interrupt such rotary motion of said channel digging plate after its release by the stop unit and during engagement of the plate in the earth in channel digging relation; said time-delay mechanism including a normally latched but retractible stop, a member on the rotary plate assembly adapted to engage said retractible stop, and means to release and retract the latter a delayed time after engagement of the member therewith, said last named means including a member actuated pendulum.

6. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, and time-delay mechanism cooperating with said plate assembly arranged to momentarily interrupt such rotary motion of said channel digging plate after its release by the stop unit and during engagement of the plate in the earth in channel digging relation; said time-delay mechanism including a member normally upstanding in trailing relation to the channel digging plate, a separate, normally latched but retractible stop in the path of rotary motion of said member, a pendulum adapted to be engaged and swung in one direction by motion of said member toward the retractible stop, and means, placed in operation upon being struck by the pendulum swinging in the other direction, to unlatch and retract said separate stop.

7. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, and time-delay mechanism cooperating with said plate assembly arranged to momentarily interrupt such rotary motion of said channel digging plate after its release by the stop unit and during engagement of the plate in the earth in channel digging relation; said time delay mechanism including a member projecting from the shaft in trailing relation to the plate, an upstanding holding arm pivotally mounted ahead of said assembly for longitudinal swinging motion, a stop element on the arm normally in the path of said member, means releasably latching the holding arm against forward swinging motion to clear said element from such path, and a pendulum, engaged and swung upward by the member moving toward said stop element, mounted in position to strike and release said latching means upon a down stroke of said pendulum.

8. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, a separate, normally upstanding plate on the shaft in trailing relation to the channel digging plate, a frame upstanding ahead of said plate assembly, a holding arm pivoted on the frame ahead of the downward rotary path of the channel digging plate, a stop element projecting rearwardly from the holding arm normally in the path of downward swinging motion of said separate plate, releasable latch means normally securing the holding arm against forward swinging motion whereby said separate plate is engaged by said stop element to momentarily prevent rotation of the plate assembly after release of the channel digging plate from the stop unit and during engagement of said plate in the earth in channel digging relation, and time-delay mechanism placed in operation by downward swinging of said separate plate toward the stop element operative to release said latch means to permit the holding arm to swing forward and retract the stop element from said separate plate.

9. In an implement, for forming a circuitous irrigation course, which implement includes a transverse shaft-supported, rotary, earth working plate assembly having a normally forwardly projecting, channel digging plate adapted to rotate downward into the ground and to dig a transverse channel therein upon advance of the implement, a releasable stop unit normally holding the channel digging plate against downward rotary motion, a separate, normally upstanding plate on the shaft in trailing relation to the channel digging plate, a frame upstanding ahead of said plate assembly, a holding arm pivoted on the frame ahead of the downward rotary path of the channel digging plate, a stop element projecting rearwardly from the holding arm normally in the path of downward swinging motion of said separate plate, releasable latch means normally securing the holding arm against forward swinging motion whereby said separate plate is engaged by said stop element to momentarily prevent rotation of the plate assembly after release of the channel digging plate from the stop unit and during engagement of said plate in the earth in channel digging relation, and time-delay mechanism placed in operation by downward swinging of said separate plate toward the stop element operative to release said latch means to permit the holding arm to swing forward and retract the stop element from said separate plate; said time delay mechanism comprising a pendulum pivoted on the frame for swinging in a longitudinal vertical plane, a trigger part on the pendulum engaged and swung downward by said separate plate moving toward the stop element, the pendulum thus being swung forwardly and upwardly, and the latch means being struck and released by the pendulum on its down-swing.

10. An implement, as in claim 9, in which the pendulum includes an upstanding post, and a vertical adjustable weight on said post.

HERBERT B. MOORE.

REFERENCES CITED

The following references are of record in the file of this patent:

UNITED STATES PATENTS

| Number | Name | Date |
| --- | --- | --- |
| 1,611,817 | Cook et al. | Dec. 21, 1926 |
| 2,220,659 | Petzoldt | Nov. 5, 1940 |